C. F. NORTON.
AUTOMOBILE LOCKING DEVICE.
APPLICATION FILED AUG. 1, 1918.
1,349,849.
Patented Aug. 17, 1920.
3 SHEETS—SHEET 3.
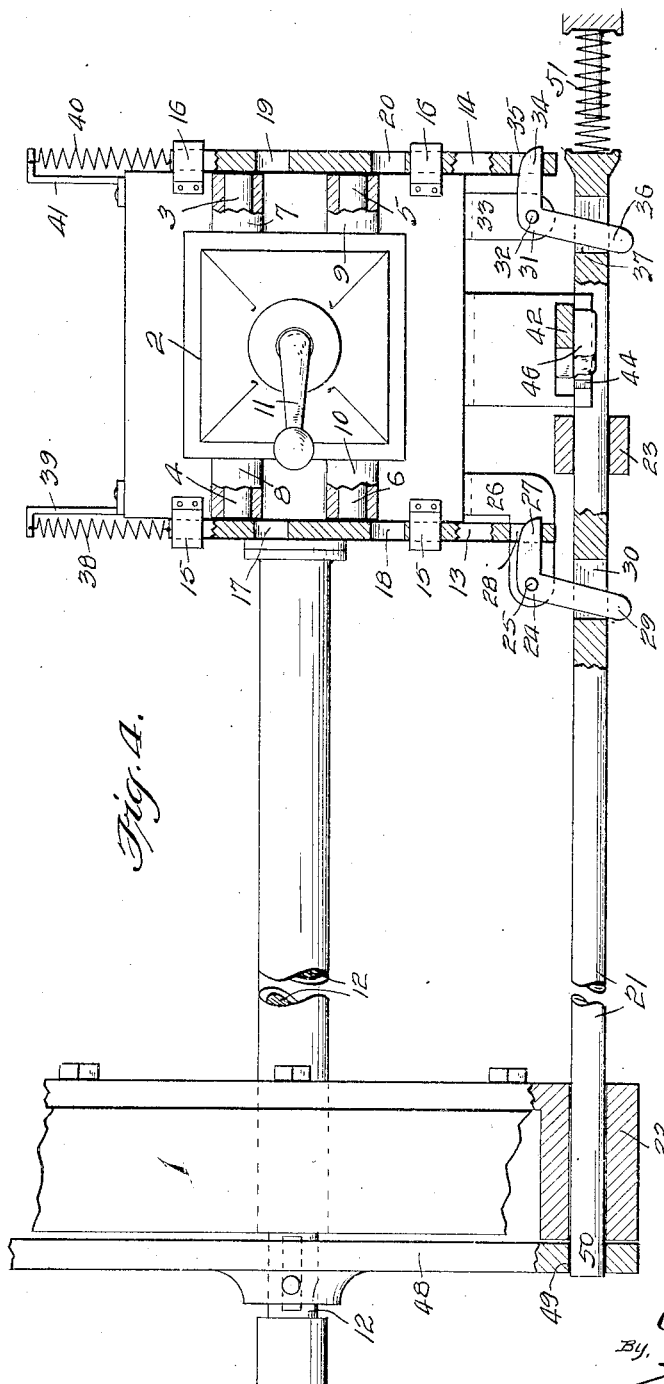
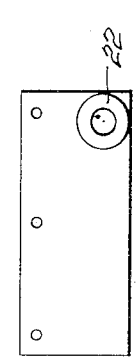
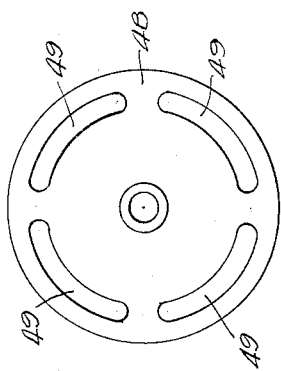
Inventor:
Charles F. Norton,
By, Fred'k J. Larson
Attorney.

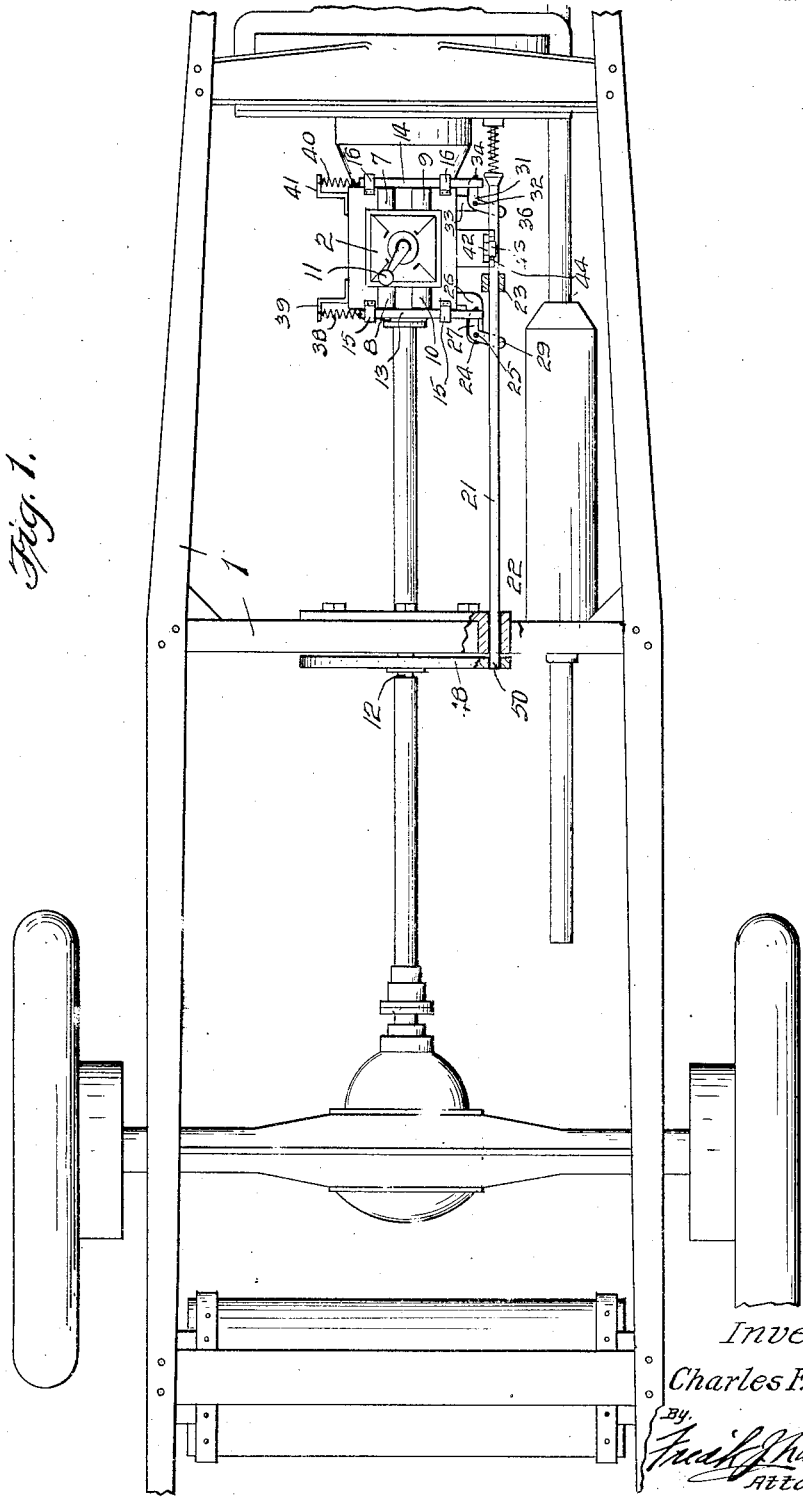

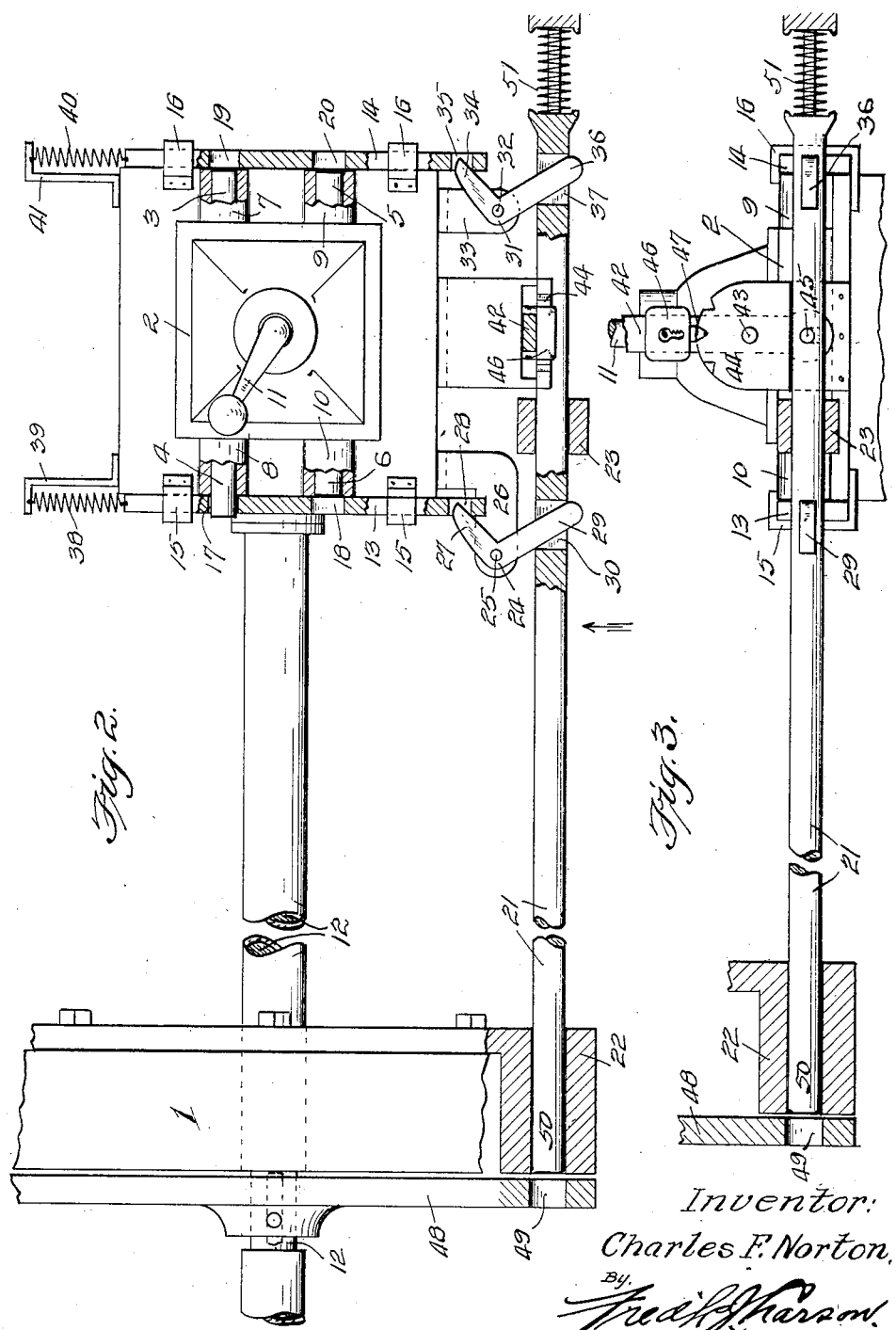

UNITED STATES PATENT OFFICE.

CHARLES F. NORTON, OF EAST ST. LOUIS, ILLINOIS.

AUTOMOBILE-LOCKING DEVICE.

1,349,849.   Specification of Letters Patent.   Patented Aug. 17, 1920.

Application filed August 1, 1918. Serial No. 247,794.

*To all whom it may concern:*

Be it known that I, CHARLES F. NORTON, a citizen of the United States, residing at East St. Louis, in the county of St. Clair and State of Illinois, have invented certain new and useful Improvements in Automobile-Locking Devices, of which the following is a specification.

My invention relates to an automobile locking device, and has for its object to provide a simple and effective device, whereby an automobile may be readily and quickly locked by the operator to prevent the theft or unauthorized use thereof.

A further object of the invention is to provide a simple means adapted to be fixed to the drive-shaft and a movable means adapted to co-act therewith to prevent the vehicle from being towed away.

A still further object of the invention is to provide a simple means adapted to be applied to the transmission-case, to prevent the gear-pins mounted in the cover plate from moving when an attempt is made to shift the transmission from neutral into gear through the gear shift lever.

With the above and other objects in view, the invention consists in certain novel features of construction, arrangement and combination of parts, as will be fully described in the following specification and finally pointed out in the claims hereto appended.

Referring to the accompanying drawings, forming a part of this specification wherein like characters of reference denote similar parts throughout the several views:

Figure 1, is a plan view of an automobile chassis, showing my improved locking mechanism applied thereto.

Fig. 2, is a plan view of an automobile chassis, with portions thereof broken away to more clearly illustrate the application of my invention, the same being shown in its unlocked position.

Fig. 3, is a side elevation of the device looking in direction of the arrow in Fig. 2.

Fig. 4, is a plan view similar to Fig. 2, showing the device in its locked position.

Fig. 5, is a detail of the member adapted to be fixed to the driving-shaft.

Fig. 6, is a detail of the member adapted to be fixed to the chassis-frame to provide a guide and support for the locking-rod.

Referring to the drawings the reference character 1 designates an automobile chassis; 2 the transmission case thereof which is provided with the four sliding pins, 3, 4, 5 and 6 carried in the bearings 7, 8, 9 and 10, respectively, of the cover plate; 11 designates the gear shift lever, while 12 designates the driving-shaft.

In carrying out the aim of my present invention, I employ a pair of sliding or shutter plates 13 and 14 adapted to be carried in suitable bearings 15 and 16, preferably supported by the cover plate of the transmission case.

Shutter-plate 13, is provided with an opening 17 for the reception of the sliding pin 4 and an opening 18 for the reception of the sliding pin 6, while the shutter-plate 14 is provided with an opening 19 for the reception of the sliding pin 3 and an opening 20 for the reception of the sliding pin 5, as clearly shown in Figs. 2 and 4, of the drawings. When the shutter-plates 13 and 14 are in their neutral position the openings 17, 18, 19 and 20 thereof are in registered relation with their respective sliding pins 4, 6, 3 and 5, respectively.

The means for actuating the shutter-plates 13 and 14 consists of a plunger-rod 21 mounted in suitable bearings 22 and 23. Bearing 22 is illustrated as supported from one of the cross-pieces of the chassis-frame 1, while bearing 23 may be supported in any well known convenient manner.

An angle-lever 24 is pivotally supported as at 25 upon a suitable support 26. Arm 27, of the angle-lever 24 is adapted to be received in the opening 28 of the shutter-plate 13, and the arm 29 of the angle-lever 24 is adapted to be received in the opening 30 of the plunger-rod 21.

An angle-lever 31 is pivotally supported, as at 32, upon a suitable support 33. Arm 34 of the angle-lever 31 is adapted to be received in the opening 35 of the shutter-plate 14, and the arm 36 of the angle-lever 31 is adapted to be received in the opening 37 of the plunger-rod 21.

A coiled spring 38 is connected at one end, to one end of the shutter-plate 13, and the opposite end of the spring is connected to a support 39. A coiled spring 40 is connected at one end, to one end of the shutter-plate 14 and the opposite end of the spring is connected to a suitable support 41.

The means for actuating the plunger-rod 21 consists of a suitable operating-lever 42 pivoted as at 43 to a suitably supported notched quadrant 44. The lower end of the operating-lever 42 is pivotally connected, as at 45, to the plunger-rod 21, as shown in Fig. 3. The operating-rod 42 is provided with a suitable lock 46 so that the locking plunger 47 thereof may be controlled by means of a suitable key, not shown, as is manifest.

A suitable driving-shaft lock-plate 48 is suitably fixed to the driving-shaft 12 so as to rotate therewith. The lock-plate 48 is provided with a plurality of suitably spaced slotted openings 49 arranged concentric with the driving-shaft opening of the plate and are adapted to receive the free end 50 of the plunger rod 21 when it is desired to lock the driving-shaft from rotation.

The operation of the device is as follows:

When the device is in neutral position, the openings in the shutter-plates are in registered relation with their respective sliding pins of the transmission case cover and the free end 50 of the plunger-rod 21 is withdrawn from the openings 49 of the driving-shaft lock-plate 48. When the shutter plates 13 and 14 are in their neutral position, as shown in Fig. 2, the operating-lever 11 may be moved so as to bring the transmission mechanism into low gear, reverse, second or high, owing to the fact that the sliding-pins may pass through their respective openings in the shutter plates 13 and 14, as is manifest. In Fig. 2, the sliding pin 4 is shown as passed through the opening 17 in the shutter-plate 13, thereby permitting the car to start up in low gear.

Now, if it is desired to lock the vehicle, the operator places the gear-shift lever 11 into neutral position which withdraws all sliding-pins from their respective openings in the shutter plates. After this usual operation, when stopping a car, the operator then pushes forward on the plunger-rod operating lever 42 which causes the plunger-rod 21 to move the arms 29 and 36 of the angle-levers 24 and 31, respectively, and thereby causing the arms 27 and 34 to pull the shutter plates laterally to a point where the sliding pin receiving openings of each shutter plate is out of registered relation with the sliding pins, as shown in Fig. 4, thereby making it impossible to shift the gears from neutral as the sliding pins cannot extend out of these bearings, as shown in Fig. 4. This same movement of the operating lever 42 forces the free end 50 of the plunger-rod 21 through one of the slotted openings 49 of the driving shaft lock-plate 48, thereby preventing rolling movement of the vehicle or towing thereof by unauthorized parties, as is manifest.

It will here be observed, that the sliding pin locking mechanism can be used independent of the drive-shaft locking device by shortening the plunger rod 21 so the free end 50 thereof will not co-act with the driving shaft lock-plate 48, or, by eliminating the shutter plates 13 and 14, and their connections, the driving shaft only may be locked, as is manifest.

If desired, a release spring 51 may be employed to co-act with one end of the plunger-rod 21, as shown in Figs. 2, 3, and 4.

By actuating the plunger 47 of the lock 46 with a key, it will be observed that the entire locking device may be locked, so the transmission mechanism cannot be actuated and so the driving shaft cannot be revolved for towing or rolling the vehicle.

The many advantages of a locking device of the class herein described will readily suggest themselves to those skilled in the art to which it appertains.

I am aware that various changes may be made in the particular construction and arrangement of the several parts, constituting my invention without departing from the spirit thereof, hence wish it to be clearly understood that the drawings are merely illustrative and that I reserve the right to make any such changes or modifications as may fairly fall within the scope of the appended claims when fairly construed.

What I claim is:

1. In combination with a vehicle having a drive shaft and a transmission case provided with sliding pins, means movable in front of the sliding pins to block movement thereof, a lock plate fixed to the driving shaft, a plunger-rod, means for actuating the plunger-rod to cause same to engage the lock-plate and hold the driving shaft from rotation, means for operatively connecting the means movable in front of the sliding pins with the plunger rod, and a lock for locking the means for actuating the plunger-rod.

2. In combination with a vehicle having a driving shaft and a transmission case provided with sliding-pins adapted to be actuated when changing gear, means adapted to be positioned in front of said pins having openings therein for the entrance of said pins when in their extended position, means for moving said means so as to block the movement of said pins and prevent unauthorized persons from shifting the transmission gears from neutral position into gear, and means for simultaneously locking the driving shaft against rotation to prevent towing or rolling of the vehicle.

In testimony whereof I have hereunto signed my name to the specification.

CHARLES F. NORTON.